US012249789B2

(12) United States Patent
Tsai et al.

(10) Patent No.: US 12,249,789 B2
(45) Date of Patent: Mar. 11, 2025

(54) CABLE STRAIN RELIEF STRUCTURE

(71) Applicant: DELTA ELECTRONICS, INC., Taoyuan (TW)

(72) Inventors: Jen-Chieh Tsai, Taoyuan (TW); Yi-Chih Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 343 days.

(21) Appl. No.: 17/875,361

(22) Filed: Jul. 27, 2022

(65) Prior Publication Data

US 2023/0396017 A1 Dec. 7, 2023

(30) Foreign Application Priority Data

Jun. 2, 2022 (CN) ......................... 202210629755.2

(51) Int. Cl.
*H01R 13/58* (2006.01)
*H01R 13/516* (2006.01)

(52) U.S. Cl.
CPC ....... *H01R 13/5845* (2013.01); *H01R 13/516* (2013.01); *H01R 13/5825* (2013.01)

(58) Field of Classification Search
CPC ............ H01R 13/5845; H01R 13/5825; H01R 13/516
USPC .......................................................... 439/452
See application file for complete search history.

(56) References Cited

U.S. PATENT DOCUMENTS 9,494,745 B2 * 11/2016 Iizumi ................ G02B 6/44775
2010/0151721 A1 6/2010 Tyler
2013/0224989 A1 * 8/2013 Giefers .................. H01R 13/59 174/650
2016/0372860 A1 * 12/2016 D'Addario ............. H01R 9/053
2018/0034199 A1 2/2018 Haunberger et al.
2019/0356078 A1 * 11/2019 Li ........................ H01R 13/504
2022/0043230 A1 * 2/2022 Koch ................... H01R 13/512
2022/0410498 A1 * 12/2022 Noormohammadi ... B60L 53/16
2023/0198198 A1 * 6/2023 Morello ............. H01R 13/5812 439/460

FOREIGN PATENT DOCUMENTS

CN 102246358 A 11/2011
CN 107681341 A 2/2018
DE 102013113878 A1 * 6/2015 ......... H01R 13/5208

OTHER PUBLICATIONS

Office Action dated Dec. 28, 2022 of the corresponding Taiwan patent application No. 111120544.

* cited by examiner

*Primary Examiner* — Marcus E Harcum
(74) *Attorney, Agent, or Firm* — Chun-Ming Shih; HDLS IPR SERVICES

(57) ABSTRACT

A cable strain relief structure includes a conducting seat, a cable, a supporting element, and an insulating sleeve. The conducting seat includes an insulating body and a conducting element disposed in the insulating body. The cable passes through the insulating body and is electrically connected to the conducting element. The supporting element includes a plurality of ridges arranged spacedly and annularly on the outer periphery of the cable. The ridges are extended in the direction along the cable and away from the insulating body. The insulating sleeve covers the supporting element and is extended in the direction along the cable.

9 Claims, 7 Drawing Sheets

CABLE STRAIN RELIEF STRUCTURE

BACKGROUND

Technical Field

The technical field relates to an outlet structure of a cable, and more particularly relates to a cable strain relief structure.

Description of Related Art

Electronic devices are mostly connected through cables to transmit power or signals. Additionally, the connection between the cable and the electronic device is often subjected to a large torsional stress when the cable is in use or moving, and that may result in damage to the cable and shorten the service life.

Moreover, now the electronic device is usually equipped with a strain relief structure at the place where the electronic device is connected to the cable. The strain relief structure includes a covering sleeve directly formed at the place where the electronic device or the connector is connected to the cable in order to eliminate or reduce the stress at the connection of the connector and the cable. However, the strain relief structure may still generate stress concentration at the connection of the covering sleeve, and that may cause the cable to be broken or damaged.

In view of the above drawbacks, the inventor proposes this disclosure based on his expert knowledge and elaborate researches in order to solve the problems of related art.

SUMMARY

One object of this disclosure is to provide a cable strain relief structure, in which a plurality of ridges is arranged on the outer periphery of the cable to eliminate or reduce the stress around the joint where the connector and the cable are connected.

In the embodiment of this disclosure, a cable strain relief structure includes a conducting seat, a cable, a supporting element, and an insulating sleeve. The conducting seat includes an insulating body and a conducting element disposed in the insulating body. The cable passes through the insulating body and is electrically connected to the conducting element. The supporting element includes a plurality of ridges arranged spacedly and annularly on the outer periphery of the cable. The ridges are extended in the direction along the cable and away from the insulating body. The insulating sleeve covers the supporting element and is extended in the direction along the cable.

In comparison with the related art, the cable strain relief structure in this disclosure includes a supporting element disposed on the outer periphery of cable. The supporting element is connected to the conducting seat and includes a plurality of ridges arranged spacedly and annularly. The ridges are extended in the direction along the cable and away from the insulating body. Therefore, when the force is applied between the conducting seat and the cable, the stress may be extended along the ridges and gradually dispersed to eliminate the stress concentration for extending the service life of the cable.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
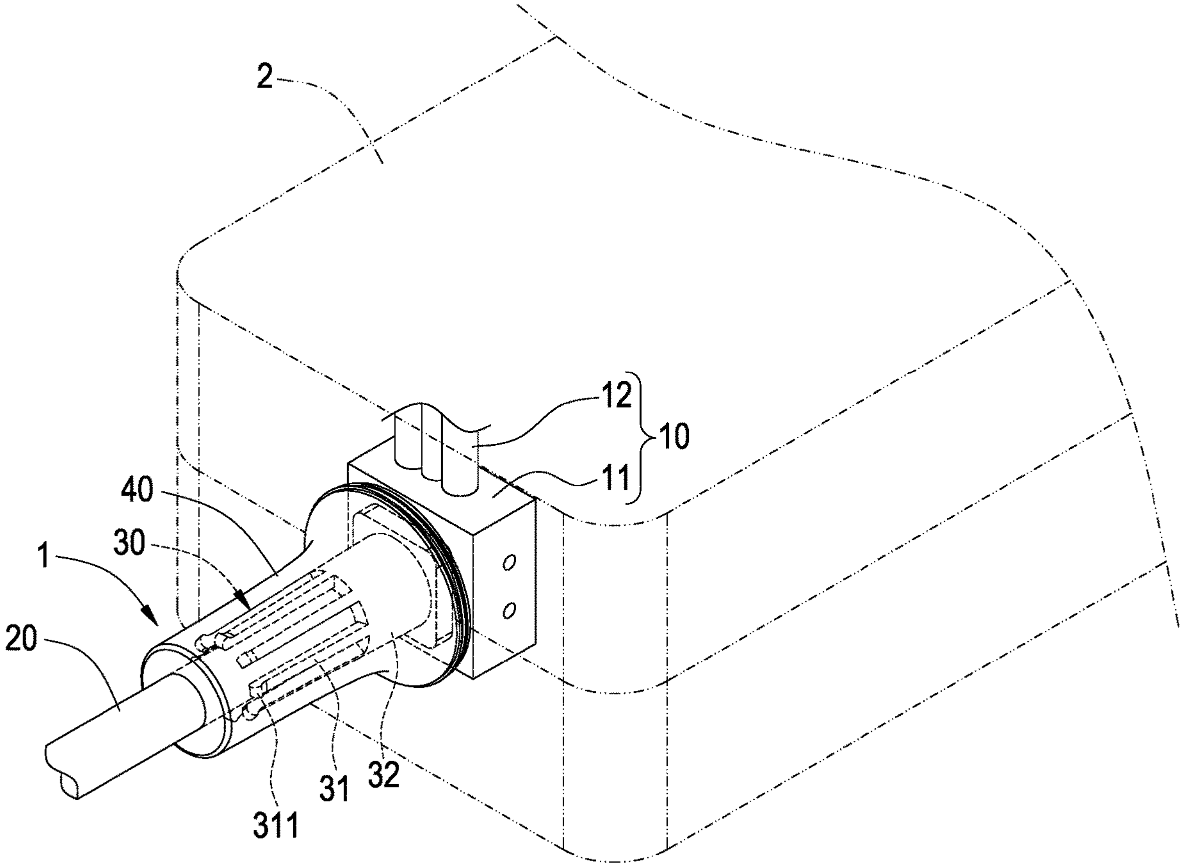
FIG. 1 is an application schematic view of the cable strain relief structure in this disclosure.

Please refer to FIG. 1, which depicts an application schematic view of the cable strain relief structure in this disclosure. A cable strain relief structure 1 in this disclosure is used to connect an electronic device 2 or a connector, etc. In this embodiment, the electronic device 2 is a power supply, but it is not limited thereto. The cable strain relief structure 1 includes a conducting seat a cable 20, a supporting element 30 and an insulating sleeve 40. The cable 20 is electrically connected to the conducting seat 10. The supporting element 30 covers the cable 20. The insulating sleeve 40 is connected with the conducting seat 10 and covers the supporting element 30 to configure the cable strain relief structure 1.

Figure 2:
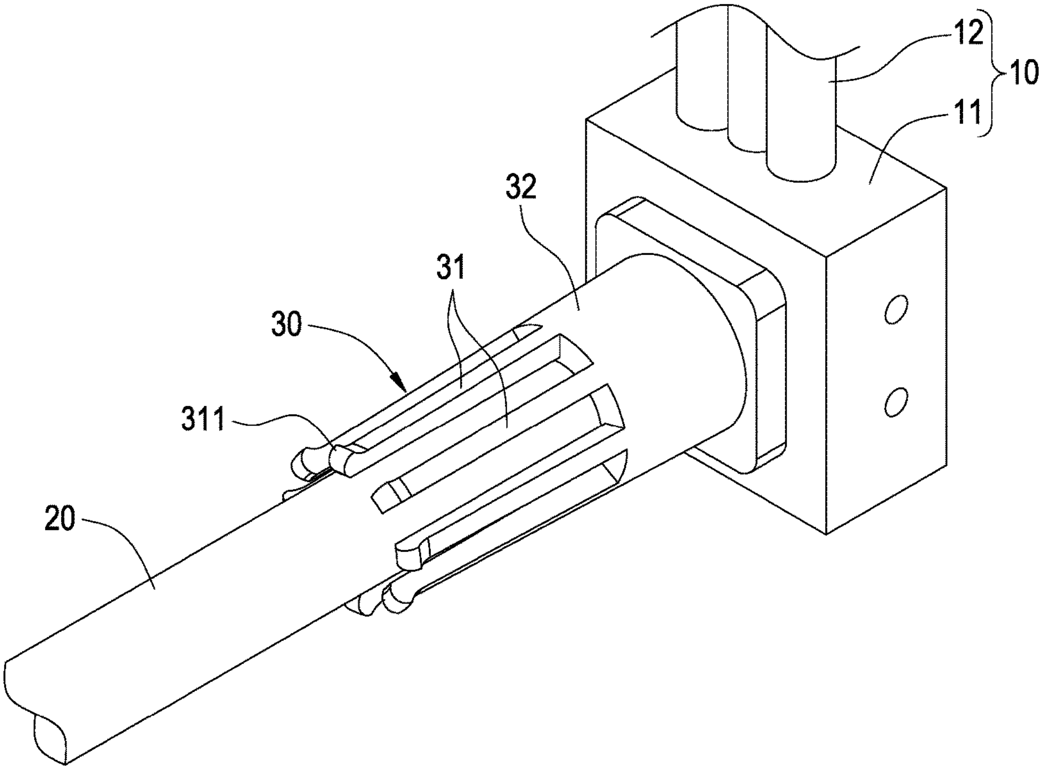
FIG. 2 is a perspective view of the cable strain relief structure without being covered by the insulating sleeve in this disclosure.
Figure 3:
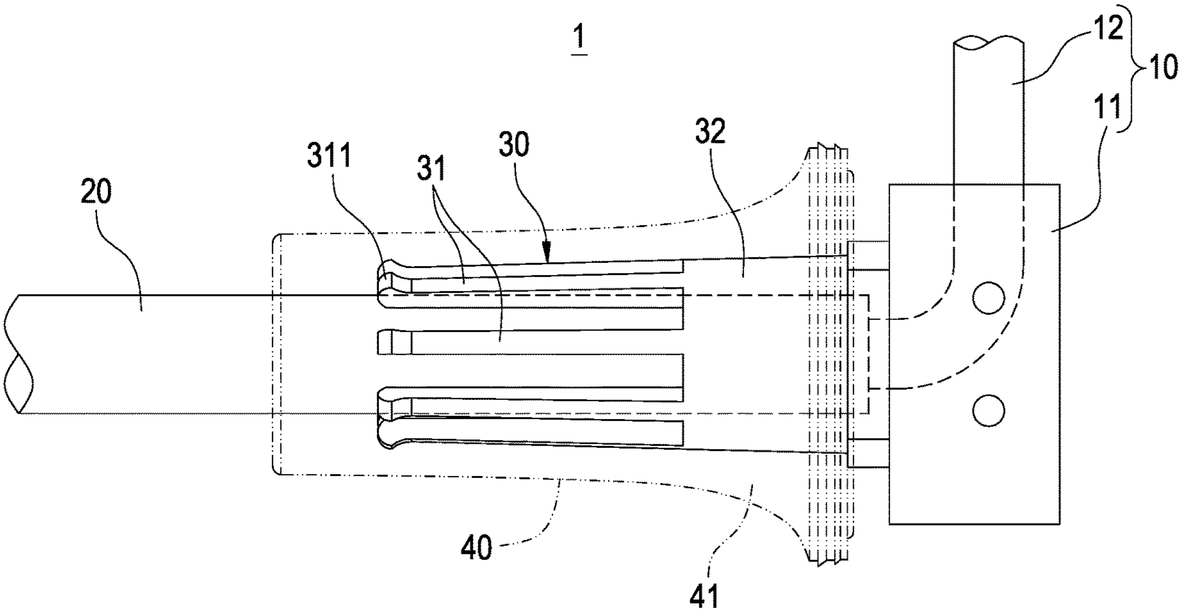
FIG. 3 is a side view of the cable strain relief structure in this disclosure.

Please further refer to FIG. 2 and FIG. 3, which depict a perspective view of the cable strain relief structure without being covered by the insulating sleeve and a side view of the cable strain relief structure in this disclosure. The conducting seat 10 includes an insulating body 11 and a conducting element 12 disposed in the insulating body 11. Furthermore, the conducting element 12 includes a plug, a connector, or a plurality of conducting wires. In this embodiment, the conducting element 12 includes a plurality of conducting wires.

The cable 20 passes through the insulating body 11 and is electrically connected to the conducting element 12. In some embodiments, the cable 20 includes a plurality of twisted pairs or a copper coaxial cable, etc.

Moreover, the supporting element 30 includes a plurality of ridges 31 arranged spacedly and annularly on the outer periphery of the cable 20. The ridges 31 are extended in the direction along the cable 20 and away from the insulating body 11. In one embodiment of this disclosure, each ridge 31 is an elongated rib and has a claw 311 disposed on the end thereof. Additionally, the ridges 31 are disposed parallelly and annularly on the surface of the cable 20.

In this embodiment, the supporting element 30 further includes an inner annular plate 32. The inner annular plate 32 is disposed between the insulating body 11 and the ridges 31. One side of the inner annular plate 32 is connected to the insulating body 11, and another side of the inner annular plate 32 is connected to the ends of the ridges 31. In some embodiments, the ridges 31 and the inner annular plate 32 are formed as one piece (or integrally formed).

Furthermore, the insulating sleeve 40 covers the supporting element 30 and is extended along the cable 20. In some embodiments of this disclosure, the insulating sleeve 40 includes a conical opening 41 defined relatively to one side of the conducting seat 10.

Figure 4:
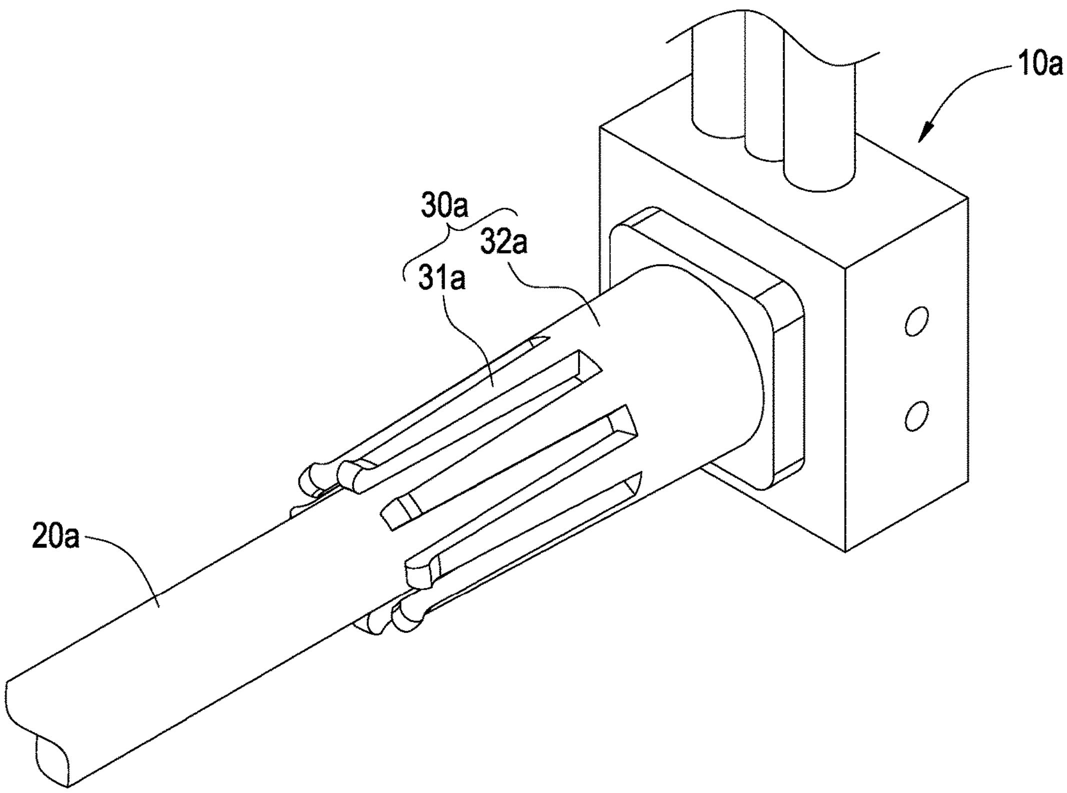
FIG. 4 is a perspective schematic view of another embodiment of the cable strain relief structure in this disclosure.
Figure 5:
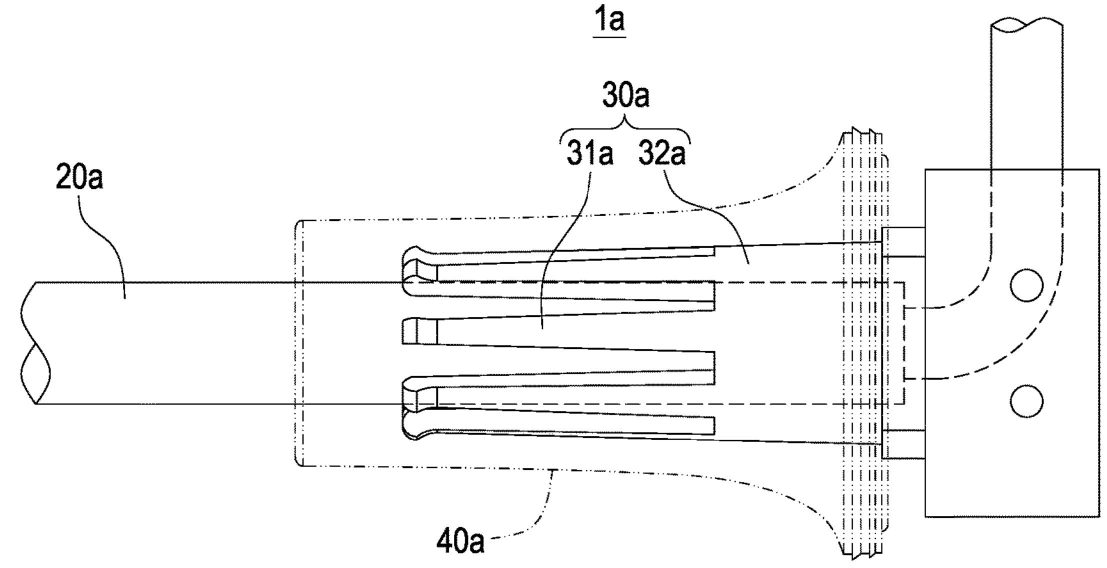
FIG. 5 is a side view of another embodiment of the cable strain relief structure in this disclosure.

Please further refer to FIG. 4 and FIG. 5, which depict a perspective schematic view and a side view of another embodiment of the cable strain relief structure in this disclosure. This embodiment is similar to the previous embodiment. The cable strain relief structure 1*a* includes a conducting seat 10*a*, a cable 20*a*, a supporting element 30*a* and an insulating sleeve 40*a*. The structures of the conducting seat 10*a*, the cable 20*a* and the insulating sleeve 40*a* are the same as the previous embodiment. The difference between this embodiment and the previous embodiment is the structure of the supporting element 30*a*.

The supporting element 30*a* includes a plurality of ridges 31*a* and an inner annular plate 32*a*, and the ridges 31*a* are disposed spacedly and annularly. In this embodiment, the width of each ridge 31*a* is gradually decreased from one side of the inner annular plate 32*a* toward the direction away from the conducting seat 10*a*.

Figure 6:
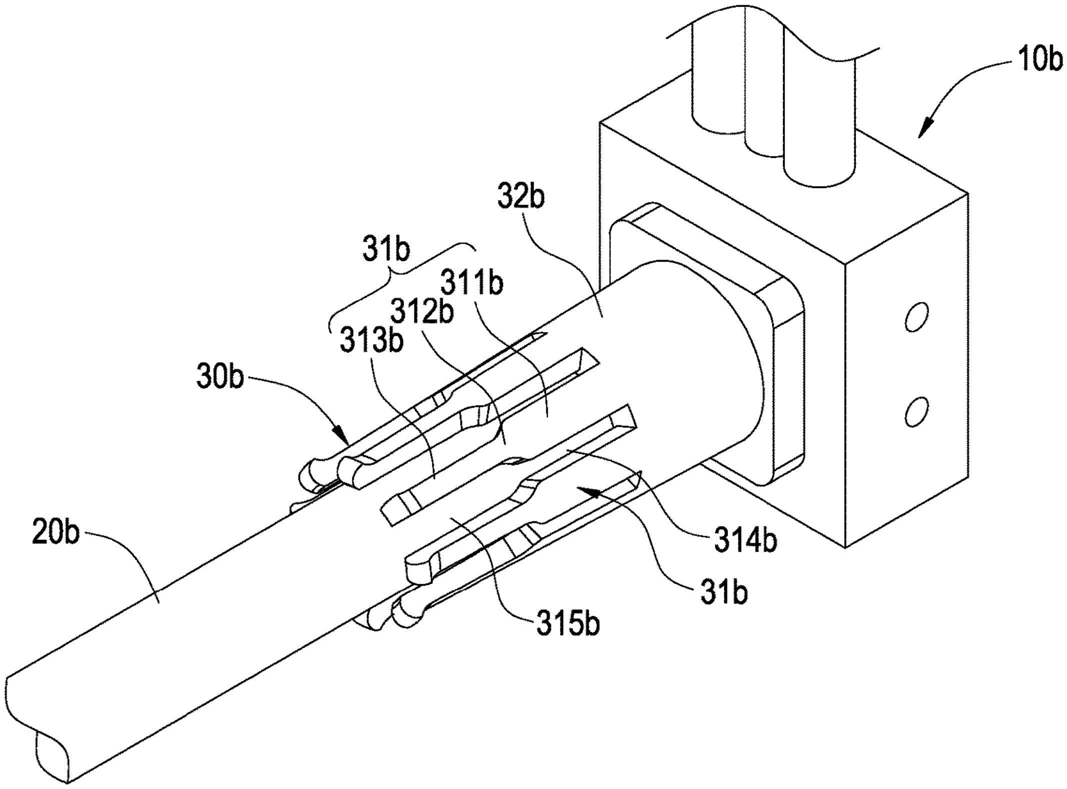
FIG. 6 is a perspective schematic view of still another embodiment of the cable strain relief structure in this disclosure.
Figure 7:
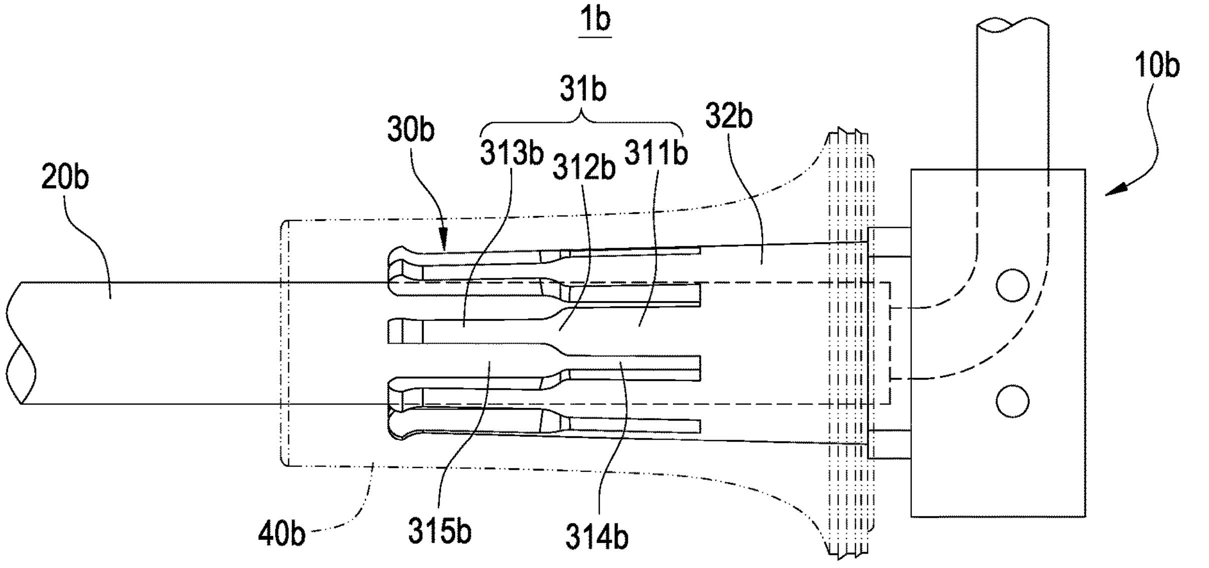
FIG. 7 is a side view of still another embodiment of the cable strain relief structure in this disclosure.

Please refer to FIG. 6 and FIG. 7, which depict a perspective schematic view and a side view of still another embodiment of the cable strain relief structure in this disclosure. This embodiment is similar to the previous embodiment. The cable strain relief structure 1*b* includes a conducting seat 10*b*, a cable 20*b*, a supporting element 30*b* and an insulating sleeve 40*b*. The structures of the conducting seat 10*b*, the cable 20*b* and the insulating sleeve 40*b* are the same as the previous embodiment. The difference between this embodiment and the previous embodiment is the structure of the supporting element 30*b*.

The supporting element 30*b* includes a plurality of ridges and an inner annular plate 32*b*, and the ridges 31*b* are disposed spacedly and annularly. In this embodiment, each ridge 31*b* includes a supporting section 311*b*, a necked section 312*b* and an extension section 313*b* in different widths. The supporting section 311*b* is connected to the inner annular plate 32*b*. The necked section 312*b* is disposed between the supporting section 311*b* and the extension section 313*b*. Specifically, a supporting distance 314*b* is defined between the supporting sections 311*b* of any two ridges 31*b* adjacent to each other. Moreover, an extension distance 315*b* is defined between the extension sections 313*b* of any two ridges 31*b* adjacent to each other. In this embodiment, the supporting distance 314*b* is smaller than the extension distance 315*b*.

Figure 8:
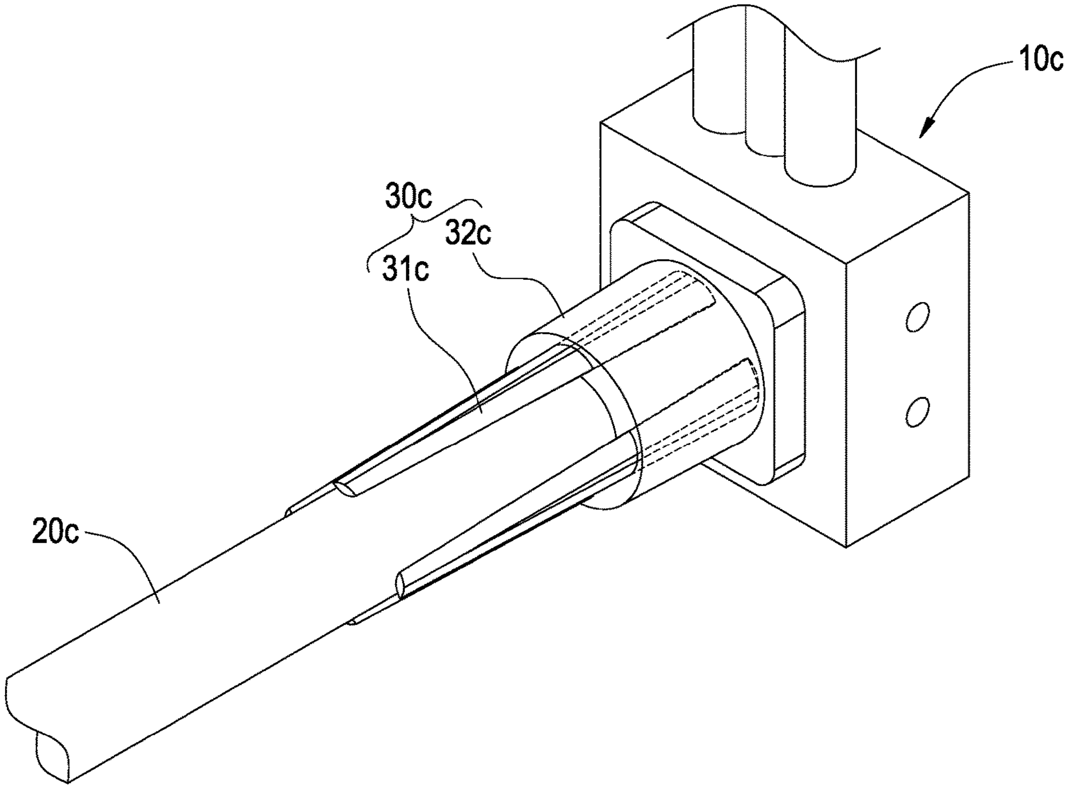
FIG. 8 is a perspective schematic view of another embodiment of the stain relief structure in this disclosure.
Figure 9:
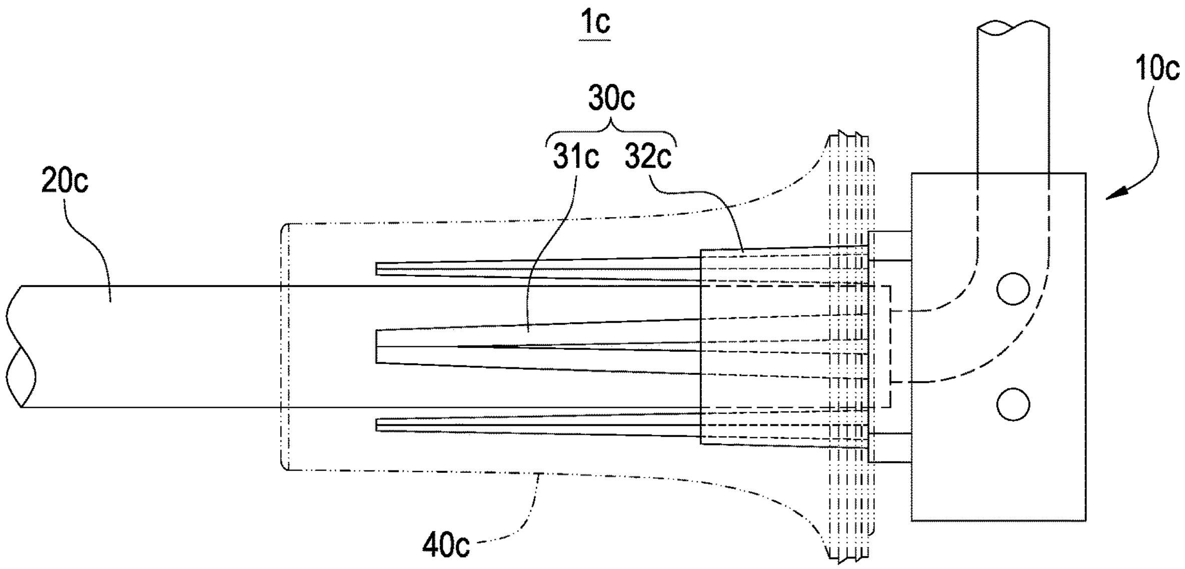
FIG. 9 is a side view of another embodiment of the cable strain relief structure in this disclosure.

Please further refer to FIG. 8 and FIG. 9, which depict a perspective schematic view and a side view of another embodiment of the cable strain relief structure in this disclosure. This embodiment is similar to the previous embodiment. The cable strain relief structure 1*c* includes a conducting seat 10*c*, a cable 20*c*, a supporting element 30*c* and an insulating sleeve 40*c*. The structures of the conducting seat 10*b*, the cable 20*b* and the insulating sleeve 40*b* are the same as the previous embodiment. The difference between this embodiment and the previous embodiment is the structure of the supporting element 30*c*.

The supporting element 30*c* includes a plurality of ridges 31*c* and an inner annular plate 32*c*, and the ridges 31*c* are disposed spacedly and annularly. In this embodiment, the width of each ridge 31*c* is gradually decreased toward the direction away from the conducting seat 10*c*. It is worth noticing that the ridges 31*c* and the inner annular plate 32*c* may be made of different materials (heterogeneous materials) to increase the gradient of stress transition. When the injection molding is performed for the inner annular plate 32*c*, the ridges 31*c* are put into the mold for injection molding together with the inner annular plate 32*c*.

Figure 10:
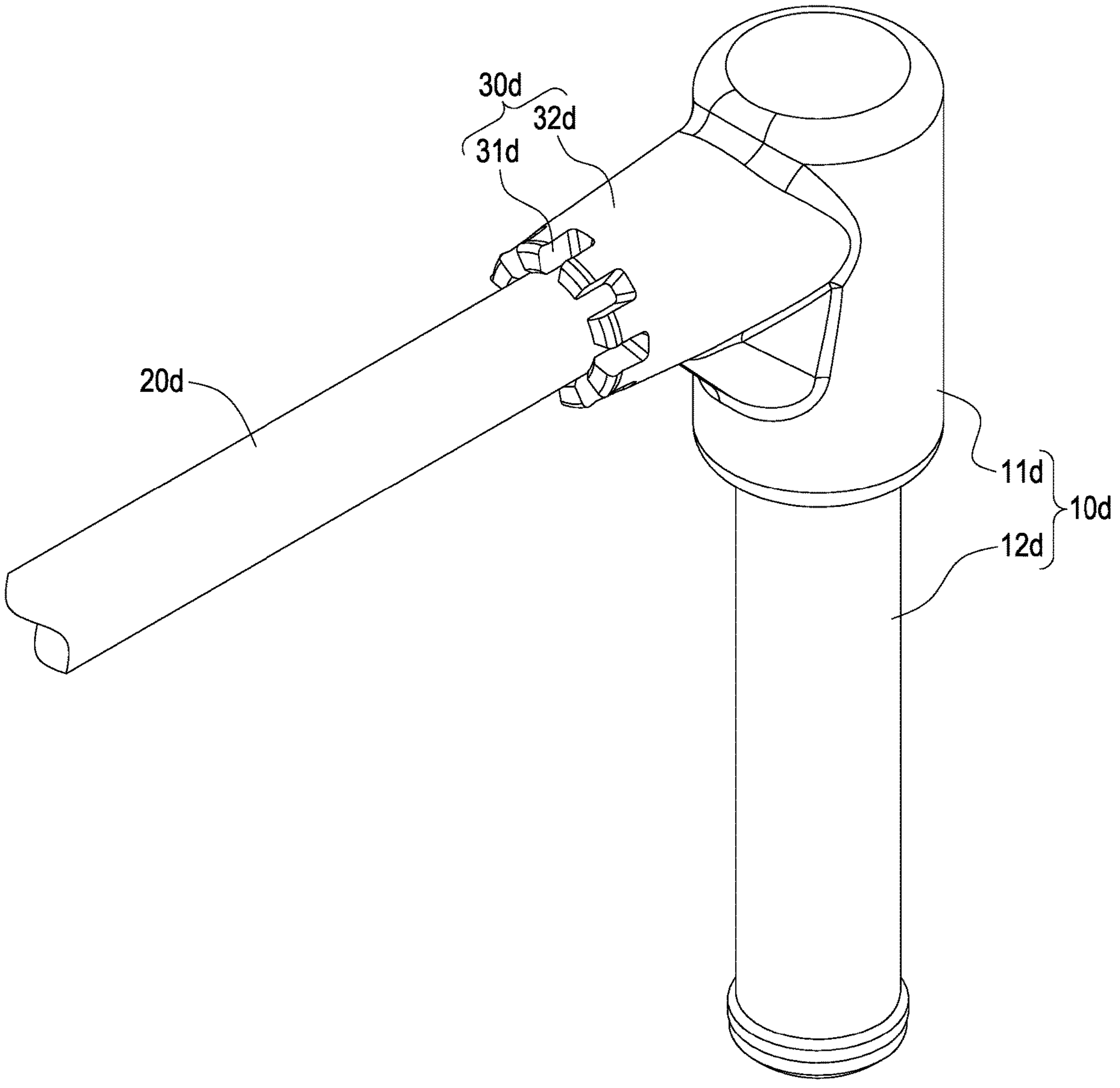
FIG. 10 is a perspective schematic view of still another embodiment of the cable strain relief structure in this disclosure.
Figure 11:
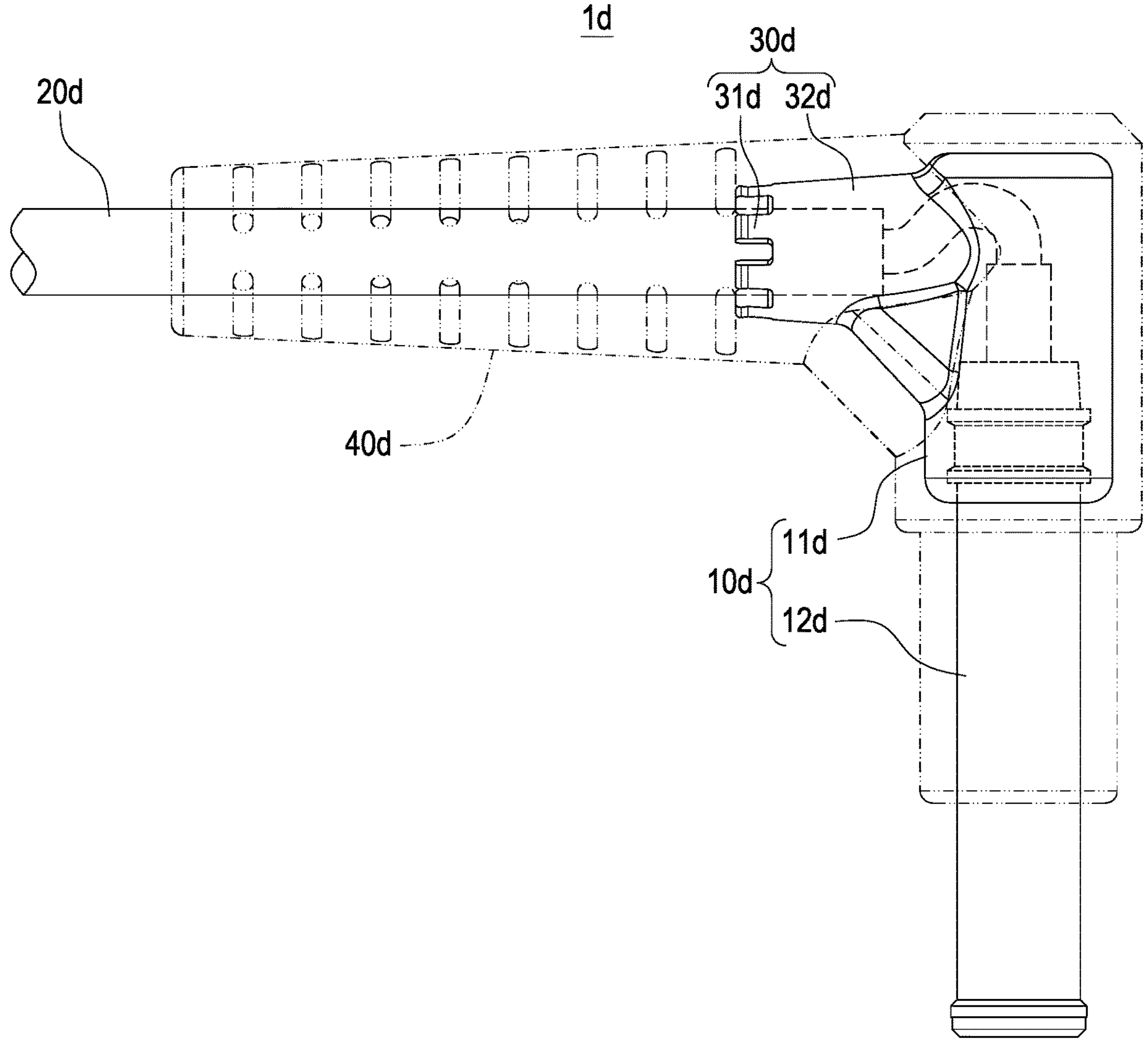
FIG. 11 is a side view of still another embodiment of the cable strain relief structure in this disclosure.

Please further refer to FIG. 10 and FIG. 11, which depict a perspective schematic view and a side view of another embodiment of the cable strain relief structure in this disclosure. This embodiment is similar to the previous embodiment. The cable strain relief structure 1*d* includes a conducting seat 10*d*, a cable 20*d*, a supporting element 30*d* and an insulating sleeve 40*d*. The conducting seat 10*d* includes an insulating body 11*d* and a conducting element 12*d* disposed in the insulating body 11*d*.

In this embodiment, the conducting element 12*d* includes a plug element. The supporting element 30*d* includes a plurality of ridges 31*d* and an inner annular plate 32*d*, and the ridges 31*d* are disposed spacedly and annularly. The plurality of ridges 31*d* are disposed in a jagged shape. It should be noted that the insulating sleeve 40*d* covers the insulating body 11*d*, part of the conducting element 12*d* and the supporting element 30*d*. The insulating sleeve 40*d* is extended in the direction along the cable 20*d*. Specifically, the insulating sleeve 40*d* is disposed in an L-shape.

While this disclosure has been described by means of specific embodiments, numerous modifications and variations could be made thereto by those skilled in the art without departing from the scope and spirit of this disclosure set forth in the claims.

What is claimed is:

1. A cable strain relief structure, comprising:

a conducting seat, comprising an insulating body and a conducting element disposed in the insulating body;

a cable, passing through the insulating body and electrically connected to the conducting element;

a supporting element, comprising a plurality of ridges arranged spacedly and annularly on an outer periphery of the cable, wherein the plurality of ridges is extended in a direction along the cable and away from the insulating body; and an insulating sleeve, covering the supporting element and extended in the direction along the cable;

wherein the supporting element further comprises an inner annular plate; and one side of the inner annular plate is connected to the insulating body, and another side of the inner annular plate is connected to ends of the plurality of ridges, and the inner annular plate extends axially along a surface of the cable and covers the plurality of ridges and the wire.

2. The cable strain relief structure according to claim 1, wherein the conducting element comprises a plug or a plurality of conducting wires.

3. The cable strain relief structure according to claim 1, wherein each of the plurality of ridges comprises a claw disposed on end thereof.

4. The cable strain relief structure according to claim 1, wherein the inner annular plate and the plurality of ridges are formed as one piece.

5. The cable strain relief structure according to claim 1, wherein the plurality of ridges and the inner annular plate are formed by injection molding.

6. The cable strain relief structure according to claim 1, wherein the plurality of ridges is disposed in a jagged shape.

7. The cable strain relief structure according to claim 1, wherein each of the plurality of ridges comprises a supporting section, a necked section, and an extension section in different widths; and the supporting section is connected to the inner annular plate, and the necked section is disposed between the supporting section and the extension section.

8. The cable strain relief structure according to claim 1, wherein a width of each of the ridges is gradually decreased from one side of the inner annular plate toward a direction away from the conducting seat.

9. The cable strain relief structure according to claim 1, wherein a width of each of the ridges is gradually decreased toward a direction away from the conducting seat.

* * * * *